United States Patent Office 3,244,690
Patented Apr. 5, 1966

3,244,690
METAL-CONTAINING FORMAZANE DYES
Willy Steinemann, Basel, Switzerland, assignor to
Sandoz Ltd., Basel, Switzerland
No Drawing. Filed Oct. 22, 1962, Ser. No. 232,313
Claims priority, application Switzerland, Oct. 27, 1961,
12,470/61
9 Claims. (Cl. 260—146)

This invention relates to a process for the production of metal-containing formazane dyes which comprises reacting in alkaline medium 2 moles of a diazo compound of an amine of the formula $$X_1-A_1-NH_2 \qquad (I)$$

wherein $A_1$ represents a substituted or unsubstituted radical of the benzene, naphthalene or diphenyl series and $X_1$ represents —OH or —COOH in ortho-position to the amino group, with 1 mole of a compound of the formula $$Z-CH_2-CO-R \qquad (II)$$

wherein Z denotes —CN or —CO—R and R represents —OH, a methoxy, ethoxy or amino group, with simultaneous or subsequent treatment with a metal-yielding agent.

The process of the invention yields dyes which in the metal-free form are of the formula

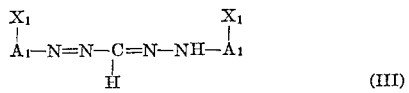
(III)

wherein $A_1$ represents a substituted or unsubstituted radical of the benzene, naphthalene or diphenyl series which may be the same or different in the two positions, and $X_1$ represents —OH or —COOH in ortho-position to the —N=N— or =N—NH— group.

The reaction is carried out in aqueous alkaline medium, preferably in the pH region of 7 to 12.5, e.g. in the presence of sodium hydroxide, sodium carbonate, sodium borate, trisodium phosphate or the corresponding potassium salts, at temperatures of about —5° to +10° C., but preferably at about 0 to 5° C. In place of water an organic solvent can be used, for instance, one the low ethers (dioxane, tetrahydrofurane) or dimethyl sulfoxide or dimethyl formamide, which permits a reaction temperature of 10-20° C. to be maintained.

When the compounds of Formula II in which R is a methoxy, ethoxy or amino group are used, the reaction can be conducted in stages, preferably at different pH values. In this case, instead of 2 moles of the diazo compound of an amine of Formula I, 1 mole each of two non-identical diazo compounds of amines of Formula I can be used, in one of which $X_1$ can have a meaning different from —OH or —COOH, e.g. hydrogen, alkyl, halogen, —SO₃H, —NO₂, acylamino-, acylalkylamino, or preferably alkoxy or carboxyalkoxy. With this procedure asymmetrical metal-containing formazane dyes can be obtained. For the production of these asymmetrical formazane dyes the first stage of the reaction is carried out preferably in a weakly alkaline medium, e.g. in the pH region 7 to 10; with energetic diazo compounds the reaction begins already in the weakly acid region, e.g. at pH 6, and it is brought to completion by adjusting to a weakly alkaline pH, e.g. by the addition of an alkali such as sodium- or potassium bicarbonate, borax, disodium or dipotassium phosphate, ammonium carbonate, ammonia solution or sodium hydroxide solution. To accelerate the reaction the temperature can be increased to 50° depending upon the stability of the diazo compound used. The intermediate product can be isolated by salting out or it can be reacted further in the same reaction medium.

Before the second stage of the reaction, the pH value is adjusted to the alkaline region, e.g. pH 9 to 12.5, with an alkaline substance which may also act as a buffer, e.g. sodium carbonate, sodium hydroxide, sodium borate, trisodium phosphate or the corresponding potassium salts. The reaction temperature and the choice of organic solvents which may be used as reaction media are the same as given above for one-stage reaction.

In the process of the invention the coupling reaction or -reactions lead to cleavage of the —CN group and the —CO—R group, or the two —CO—R groups of the compounds of Formula II respectively. The carbon atom in the meso-position of the formazane dyes so formed bears a proton.

The formazane dye obtained can be converted into its metal complex compound. This can be effected in the reaction medium itself, by carrying out the entire reaction in the one-stage procedure or the second stage in the two-stage procedure in the presence of a metal-yielding agent, where suitable in the form of metal complex compounds of hydroxycarboxylic acids such as tartaric, citric, lactic or salicylic, and under the previously described reaction conditions; or alternatively by adding a metal-yielding agent after the reaction and metallizing at an acid pH, e.g. pH 4-5, or at an alkaline pH in the presence of complex-forming hydroxycarboxylic acids.

The formazane dye can also be metallized after isolation in a separate operation. Metallization with chromium or cobalt compounds is best carried out in aqueous solution or in organic medium, e.g. formamide, or in the concentrated aqueous solution of an alkaline metal salt of a low molecular aliphatic monocarboxylic acid. If the formazane dye contains only on metallizable group, it is advantageous to allow an amount of metal-yielding agent containing less than two but at least one atom of metal to act upon two molecules of dye. If it contains two metallizable groups, it is best to employ an amount of metal-yielding agent containing at least one atom of metal to one molecule of dye. Suitable chromium compounds are e.g. chromic fluoride, chromic sulphate, chromic formate, chromic acetate, chromic potassium sulphate and chromic ammonium sulphate. Examples of suitable cobalt compounds are cobaltous formate, cobaltous acetate and cobaltous sulphate. When metallization is carried out in the concentrated aqueous solution of an alkali metal salt of a low molecular aliphatic monocarboxylic acid, water-insoluble metal compounds can be used, e.g. cobalt hydroxide and cobalt carbonate.

It is especially advantageous to carry out the metallization in an aqueous of alkaline medium to which the metal compounds are added in the presence of compounds which maintain the metals dissolved in complex combination in caustic alkaline medium, e.g. tartaric, citric, lactic and salicylic acid.

For metallization with zinc, silver, divalent iron, nickel or copper compounds, it is preferable to use, e.g., copper formate, copper acetate, copper sulphate or the corresponding zinc, silver, divalent iron or nickel salts. Coppering, for example, can be effected by various methods, for instance by heating the dye with a copper salt in a weakly acid to alkaline medium, if necessary under pressure, and/or in the presence of ammonia and/or organic bases, or in a concentrated aqueous solution of an alkali salt of a low molecular aliphatic monocarboxylic acid. Here it is desirable to allow an amount of metal-yielding agent containing at least one atom of metal to act upon one molecule of dye.

Before isolation the organic metallizing solution may be run into water. The metal complex compound is then precipitated by the addition of salt, filtered off, washed if necessary, and dried. When the final dyes contain a nitro group or a readily hydrolysable acylamino group, these can be reduced (e.g. with sodium sulphide, sodium sulphohydrate or sodium polysulphide in aqueous solution at 40–80° C.) or split off by hydrolysis (e.g. with a 2 to 8% alkali metal hydroxide solution or with a 2 to 8% mineral acid solution at 70–100° C.). On reduction with the sulphur-containing reducing agents the dye is demetallized as a rule and must be metallized again after reduction or after the further reaction of the amino group. Hydrolysis with alkali metal hydroxides or mineral acids does not usually demetallize the metal-containing formazane dye to any appreciable extent.

The following are enumerated as examples of suitable compounds which are condensible with an amino group and contain at least one substituent which is readily split off as an anion and/or an unsaturated radical which is readily capable of addition: the heterocyclic compounds cyanuric chloride, 2,4,5,6-tetrachloropyrimidine, primary condensation products of a cyanuric halide of the formula

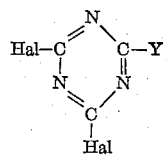

wherein Hal represents chlorine or bromine and Y the radical, which may be further substituted, of a primary or secondary aliphatic alicyclic, aromatic or heterocyclic hydroxy compound, in particular the radical of aniline, its alkyl, sulphonic acid or carboxylic acid derivatives, of low molecular mono- and di-alkylamines, and of ammonia. The introduction of a dichlorocyanuric radical is best effected in aqueous medium at about 0° C. and at a weakly acid reaction, e.g. at pH values between 2 and 5. The cyanuric chloride can be used as such in solid form or dissolved in an organic solvent, e.g. acetone. For the primary condensation products of cyanuric chloride it is best to choose a temperature of 30° to 60° C. and a pH value of 4 to 6, while for tetrachloropyrimidine temperatures between 40° and 100° C. and pH values of 4 to 10 are the most suitable.

The new dyes are used for dyeing, padding and printing fibers of animal origin, e.g. wool, silk; synthetic polyamide fibers, e.g. nylon Perlon; leather; fibers of natural cellulose, e.g. cotton, linen, and of generated cellulose e.g. viscose rayon; polyester fibers; and mixtures or other articles of the aforenamed fibers. When the dyes contain reactive groups the goods are submitted to heat treatment during or after dyeing, padding or printing. In dyeing, padding and printing the normally used wetting, levelling and thickening agents and other textile and leather chemicals can be used, while the heat treatment is carried out preferably in the presence of alkalis.

The dyeings and prints possess good to very good light fastness and good to very good wet fastness properties (fastness to perspiration, washing, milling, water and soda boiling), and good rubbing and dry cleaning fastness.

In the following examples the parts and percentages are by weight and the temperatures in degrees centigrade.

EXAMPLE 1

58.1 parts of 2-amino-1-hydroxybenzene-4-sulfonic acid phenyl amide are dissolved in 300 parts of warm water by means of 38 parts of 30% hydrochloric acid and on cooling to +5° are diazotized in the known way by the addition of a solution of 15.2 parts of sodium nitrite in 100 parts of water. A solution of 27 parts of crystallized copper sulfate in 200 parts of water, 80 parts of 30% sodium hydroxide solution and 85 parts of a 10% aqueous cyanoacetic acid solution are successively dropped into the yellow diazo solution with thorough stirring over 1½ hours. The reaction temperature is maintained below 2° by ice cooling. Stirring is continued at this temperature until no further diazo compound is indicated. Then the reaction is heated to 35° and the dark-blue symmetrical dye precipitated with common salt. It is filtered off, washed with aqueous common salt solution, dried and ground to give a black powder. This dissolves in water with a blue coloration and dyes polyamide and polyester fibers, silk and wool in blue shades of high fastness to light and milling. The dyeings have good to very good fastness to perspiration, washing, water, soda boiling, and good fastness to rubbing and dry cleaning. The corresponding nickel complex can be produced in the same way. Very similar dyes of equally good fastness are obtained when the 58.1 parts of 2-amino-1-hydroxybenzene-4-sulfonic acid phenyl amide used in the above example are replaced by the equivalent amount of one of the following and the procedure of this example is adopted.

2-amino-1-hydroxybenzene-5-sulfonic acid-phenylamide,
2-amino-1-hydroxybenzene-4- or -5-sulfonic acid-methylamide,
2-amino-1-hydroxybenzene-4- or -5-sulfonic acid-amylamide,
2-amino-1-hydroxybenzene-4- or -5-sulfonic acid-2'-hydroxy-propylamide,
2-amino-1-hydroxybenzene-4- or -5-sulfonic acid-3'-methoxypropylamide,
2-amino-1-hydroxybenzene-4- or -5-sulfonic acid-tetrahydronaphthyl(1)-amide,
2-amino-1-hydroxybenzene-4- or -5-sulfonic acid-3'-chlorophenylamide,
2-amino-1-hydroxybenzene-4- or -5-sulfonic acid-3'-sulfonamide-phenylamide,
2-amino-1-hydroxybenzene-4- or -5-sulfonic acid-4'-acetyl-phenylamide,
2-amino-1-hydroxybenzene-4- or -5-sulfonic acid-3-acetamino-phenylamide,
2-amino-1-hydroxybenzene-4- or -5-sulfonic acid-2',4'-dimethyl-phenylamide,
2-amino-1-hydroxybenzene-4- or -5-sulfonic acid-2',4',6'-trimethyl-phenylamide,
2-amino-1-hydroxybenzene-4- or -5-sulfonic acid-N-methyl-phenylamide,
2-amino-1-hydroxybenzene-4- or -5-sulfonic acid-cyclohexylamide,
2-amino-1-hydroxybenzene-4- or -5-sulfonic acid-dimethyl-amide,
2-amino-1-hydroxybenzene-4- or -5-sulfonic acid-diethyl-amide,
2-amino-1-hydroxybenzene-4- or -5-sulfonic acid-2'-carboxy-phenylamide or
2-amino-1-hydroxy-4-chlorobenzene,
2-amino-1-hydroxy-4,6-dichlorobenzene,
2-amino-1-hydroxy-3,4,6-trichlorobenzene,
2-amino-1-hydroxy-4-nitrobenzene,
2-amino-1-hydroxy-4-nitro-6-chlorobenzene,
2-amino-1-hydroxy-6-nitro-4-chlorobenzene,
2-amino-1-hydroxy-4,6-dinitrobenzene,
2-amino-1-hydroxy-4-acetaminobenzene,
2-amino-1-hydroxy-4-oxazolidonylbenzene,
2-amino-1-hydroxy-4-pyrrolidonylbenzene,
2-amino-1-hydroxy-4-methylsulfonylbenzene,
2-amino-1-hydroxy-4-tert.butylbenzene,
2-amino-1-hydroxy-4-tert.amylbenzene.

When the cyanoacetic acid used in the above example is replaced by the equivalent amount of malonic acid, malonic acid dimethyl ester, malonic acid diethyl ester or malonic acid diamide, dyes with the same good properties are obtained.

EXAMPLE 2

55.6 parts of 2-amino-1-hydroxybenzene-4-sulfonic acid phenylamide are diazotized in the known way by means of dilute hydrochloric acid and sodium nitrite at 5–8°.

The resulting yellow suspension which is of about 500 parts is adjusted to pH 8 with the necessary amount of sodium carbonate, then 20 parts of cyanoacetic acid amide are added. When this has dissolved the pH value of the suspension is adjusted to 9.8 with sodium carbonate and the reaction mass heated to 45° in 30 minutes. It is stirred at this temperature until the reaction is finished, then some common salt is added and the totally precipitated intermediate product is filtered off. It is stirred into 1000 parts of a 5.5% solution of copper sulfate pentahydrate. To this is added 1000 parts of crushed ice and a neutralized diazo suspension prepared in the usual way from 30 parts of 2-amino-1-hydroxy-4-chlorobenzene. Over the next 20 minutes 270 parts of 30% aqueous sodium hydroxide solution are run in. The temperature of the reaction mass is maintained below +2° by cooling until no further diazo compound is indicated. When this point is reached sufficient 5% aqueous hydrochloric acid is added to bring the pH value to 4.5. The resulting suspension is heated for 30 minutes at 45° and the asymmetrical dye filtered off. It is purified by vigorous stirring in about 1500 parts of a 2% aqueous ammonia solution at 50° for 30 minutes, and after the addition of some ammonium chloride is filtered off, dried and ground.

The new dyestuff dissolves in water to give blue solutions and dyes synthetic and natural polyamide fibers, notably wool, from neutral or weakly acid baths in bright, very fast blue shades.

Very similar asymmetrical dyes of equally good fastness are obtained when the 55.6 parts of 2-amino-1-hydroxybenzene-4-sulfonic acid phenyl amide used in the above example or the 30 parts of 2-amino-1-hydroxybenzene-4-chlorobenzene are replaced by the equivalent amount of one of the following and the procedure of this example is adopted.

2-amino-1-hydroxybenzene-5-sulfonic acid-phenyl amide,
2-amino-1-hydroxybenzene-4- or -5-sulfonic acid-methyl amide,
2-amino-1-hydroxybenzene-4- or -5-sulfonic acid-amyl amide,
2-amino-1-hydroxybenzene-4- or -5-sulfonic acid-2'-hydroxy-propyl amide,
2-amino-1-hydroxybenzene-4- or -5-sulfonic acid-3'-methoxypropyl amide,
2-amino-1-hydroxybenzene-4- or -5-sulfonic acid-tetrahydronaphthyl (1) amide,
2-amino-1-hydroxybenzene-4- or -5-sulfonic acid-3'-chlorophenyl amide,
2-amino-1-hydroxybenzene-4- or -5-sulfonic acid-3'-sulfonamidephenyl amide,
2-amino-1-hydroxybenzene-4- or -5-sulfonic acid-4'-acetyl-phenyl amide,
2-amino-1-hydroxybenzene-4- or -5-sulfonic acid-3'-acetamino-phenyl amide,
2-amino-1-hydroxybenzene-4- or -5-sulfonic acid-2',4'-dimethylphenyl amide,
2-amino-1-hydroxybenzene-4- or -5-sulfonic acid-2',4',6'-trimethylphenyl amide,
2-amino-1-hydroxyzenzene-4- or -5-sulfonic acid-2',4',6'-trimethylphenyl amide,
2-amino-1-hydroxybenzene-4- or -5-sulfonic acid-N-methylphenyl amide,
2-amino-1-hydroxybenzene-4- or -5-sulfonic acid-cyclohexyl amide,
2-amino-1-hydroxybenzene-4- or -5-sulfonic acid-dimethyl amide,
2-amino-1-hydroxybenzene-4- or -5-sulfonic acid-diethyl amide,
2-amino-1-hydroxybenzene-4- or -5-sulfonic acid-2'-carboxyphenyl amide or
2-amino-1-hydroxy-4-chlorobenzene,
2-amino-1-hydroxy-4,6-dichlorobenzene,
2-amino-1-hydroxy-3,4,6-trichlorobenzene,
2-amino-1-hydroxy-4-nitrobenzene,
2-amino-1-hydroxy-4-nitro-6-chlorobenzene,
2-amino-1-hydroxy-6-nitro-4-chlorobenzene,
2-amino-1-hydroxy-4,6-dinitrobenzene,
2-amino-1-hydroxy-4-acetaminobenzene,
2-amino-1-hydroxy-4-oxazolidonylbenzene,
2-amino-1-hydroxy-4-pyrrolidonylbenzene,
2-amino-1-hydroxy-4-methylsulfonylbenzene,
2-amino-1-hydroxy-4-tert.butylbenzene,
2-amino-1-hydroxy-4-amylbenzene.

When the 20 parts of cyanoacetic acid amide are replaced by the equivalent amount of malonic acid, malonic acid dimethyl ester, malonic acid diethyl ester or malonic acid diamide, asymmetrical dyes with the same good properties are obtained.

EXAMPLE 3

20.4 parts of the intermediate product obtained by coupling diazotized 2-amino-5-nitrobenzene-1-carboxylic acid with cyanoacetic acid ethyl ester and subsequent reduction of the nitro group of the nitro compound by sodium sulfide to the amino group, are dissolved in 300 parts of warm water as a neutral sodium salt. After the addition of 15 parts of crystallized sodium acetate and 22 parts of 2,4,5,6-tetrachloropyrimidine the solution is adjusted to pH 6 with acetic acid and then stirred thoroughly for 2 hours at 70–80°. On cooling to room temperature the completely precipitated trichloropyrimidylamino compound is filtered off and washed with cold water. The compound is stirred into about 350 parts of an ice-cold, mineral acid diazo solution, previously prepared by diazotization of 27 parts of 2-amino-1-hydroxybenzene-4,6-disulfonic acid by the known method. The pH value of the well stirred and well cooled suspension is adjusted to 11.5 by running in the necessary amount of sodium hydroxide solution in a few minutes. During this addition the reaction temperature must not rise above +2°. As soon as no further diazo compound is indicated, sufficient 15% hydrochloric acid is added to bring the pH of the dye solution to 4.5. 25 parts of pulverized copper sulfate pentahydrate are stirred in and the whole heated for 1 hour at 80°. The copper complex compound thus formed is reprecipitated by means of common salt and filtered off at 30°. It is purified, e.g. by re-crystallization from water, and then dried and ground. A dark blue powder is obtained which dissolves in concentrated sulfuric acid with a violet coloration and in water with a navy-blue coloration.

*Dyeing example.*—A cotton fabric is padded at 50° with a 1.5% solution of the dye of Example 3 containing 20 parts of sodium carbonate and 200 parts of urea per 100 parts. The fabric is dried, heated at 150° for 5 minutes, rinsed, soaped at the boil for 30 minutes, rinsed again and dried. A fast, level navy-blue dyeing is obtained. With the nickel complex compound produced in an analogous manner fast violet dyeings are obtained by this method of application. When the 27 parts of 2-amino-1-hydroxybenzene-4,6-disulfonic acid used for the production of the dye of Example 3 are replaced by the equivalent amount of 2-amino-1-hydroxybenzene-4-sulfonic acid, 2-amino-1-hydroxybenzene-4-sulfonic acid-6-carboxylic acid,
2-amino-1-hydroxybenzene-6-sulfonic acid-4-carboxylic acid,
2-amino-1-hydroxy-4-methylbenzene-6-sulfonic acid,
2-amino-1-hydroxy-4-methylbenzene-5-sulfonic acid,
2-amino-1-hydroxy-6-methylbenzene-4-sulfonic acid,
2-amino-1-hydroxy-4-nitrobenzene-6-sulfonic acid,
2-amino-1-hydroxy-4-phenyl-benzene-4',6-disulfonic acid,
2-amino-1-hydroxy-4-phenyl-benzene-6-sulfonic acid,
2-amino-1-hydroxy-6-chloro-4-phenyl-benzene-4'-sulfonic acid, and the procedure of that example is followed, similar dyes with the same good properties are obtained.

EXAMPLE 4

A neutral solution of 36.3 parts of the monoazo dye produced by coupling diazotized 2-amino-1-hydroxybenzene-4,6-disulfonic acid with cyanoacetic acid amide, 25 parts of copper sulfate pentahydrate and 200 parts of water is cooled to 0° and added to a diazo solution of 18.2 parts of 1-amino-4-nitrobenzene-2-carboxylic acid prepared in the normal way. The pH value of the solution is increased to 9.0 by dropwise addition of 10% sodium carbonate solution with stirring and constant cooling to 0–2°. Stirring is continued at 0° until completion of the reaction.

The dye solution is heated at 40° and over 10 minutes a solution of 15.6 parts of sodium disulfide in 230 parts of water is added. On completion of reduction sufficient 10% hydrochloric acid is dropped in to adjust the pH value to 1.5. 10 parts of bleaching earth are added, the dye solution clarified by filtration cooled to 0° by the addition of 500 parts of ice, and adjusted to pH 7 with 8% sodium hydroxide solution.

A solution of 20 parts of cyanuric chloride in 1000 parts of acetone is charged into a mixture of 180 parts of ice and 120 parts of water to give a fine suspension which is added to the ice-cold dye solution. This reaction solution is stirred at 0° until no further diluted sodium hydroxide solution (e.g. 8%) is required to maintain the pH value within the limits 6.5 and 7. Finally the dye is isolated in the normal way and carefully dried.

Cotton fabric padded with this dye according to the method described in Example 3 is dyed in a navy-blue shade with the same good fastness properties.

When the 36.3 parts of 2-amino-1-hydroxybenzene-4,6-disulfonic acid in the above example are replaced by the equivalent amount of one of the compounds named in Example 3 and the procedure of Example 4 is adopted, similar dyes with the same good fastness properties are obtained.

EXAMPLE 5

39 parts of the copper-containing blue dye produced according to Example 4 and 8 parts of sodium 1-aminobenzene-2-carbonate are dissolved in 1000 parts of water. The solution is heated at 40° and the pH value held at 6.5–7.5 by dropwise addition of 8% sodium hydroxide solution. Stirring is continued at 40° until no further sodium hydroxide solution must be added to the reaction solution to maintain the pH value constant. When this is the case the dye is precipitated, filtered off and dried.

A cotton fabric is padded at 85° with a 2% solution of this dye containing 10% urea, and squeezed to retain 80% of its weight of the solution. It is dried, treated at room temperature with a 10% sodium hydroxide solution containing 10% sodium chloride, squeezed to retain 80% of its weight of moisture, steamed for 1 minute at 105°, rinsed, soaped for 30 minutes at the boil, rinsed again and dried. A level navy-blue dyeing is obtained.

When the 8 parts of sodium 1-aminobenzene-2-carbonate in this example are replaced by the equivalent amount of the sodium or potassium salt of 1-aminobenzene-3-sulfonic acid, 1-aminobenzene-2,5-disulfonic acid, 1-aminobenzene-1-carboxylic acid-4-sulfonic acid, 1-aminonaphthalene-5-sulfonic acid, 2-aminonaphthalene-4,8-disulfonic acid, very similar dyes with the same good properties as the one of this example are obtained.

EXAMPLE 6

29.2 parts of 3-amino-4-hydroxy-1,1'-azobenzene-3'-sulfonic acid amide are indirectly diazotized in the known way. The precipitated diazo compound is collected on a filter. The filter cake is added in small portions to a solution, externally cooled to 0°, of 36 parts of the coupling product of the formula

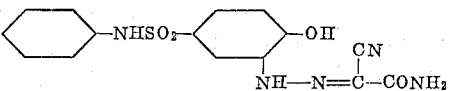

obtained by coupling equimolar amounts of diazotized 2-amino-1-hydroxybenzene-4-sulfonic acid phenyl amide with cyanoacetic acid amide in aqueous, weakly alkaline medium, 60 parts of 30% sodium hydroxide solution and 250 parts of dimethyl sulfoxide. The rate of addition of the diazo compound must be such that the reaction temperature does not rise to above +3°. Subsequently, stirring is continued at 0–3° until no further diazo compound is indicated. 35 parts of glacial acetic acid and 11 parts of copper chloride are added to the reaction solution and the whole heated for 1 hour at 70° The reaction mass is run into 800 parts of water at 60° and the precipitated copper-containing dye filtered off. It is then suspended in 800 parts of a 3% common salt solution at 40°, the pH value adjusted to 9.5 with sodium carbonate, and the suspension well stirred. The purified dye is filtered off, washed with 3% common salt solution, dried and ground to give a black powder which dissolves in concentrated sulfuric acid with a red coloration. It dyes wool, silk and synthetic polyamide fibers in fast grey to black shades.

The same dye is obtained when the diazotized 3-amino-4-hydroxy - 1,1'-azobenzene - 3'-sulfonic acid amide is coupled in weakly alkaline medium with the equimolar amount of cyanoacetic acid ethyl ester, the isolated coupling product of the formula

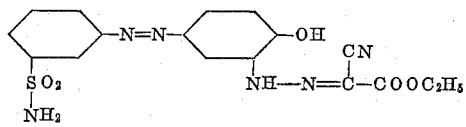

coupled with an equimolar amount of diazotized 2-amino-1-hydroxy - benzene - 4 - sulfonic acid phenyl amide by the above-described method and worked up in the same way.

The corresponding nickel and cobalt-containing dyes can be produced on analogous lines and give equally fast dyeings.

When the 3-amino-4-hydroxy-1,1'-azobenzene-3'-sulfonic acid amide of the above example is replaced by the equimolar amount of 3-amino-4-hydroxy-1,1'-azobenzene,
3-amino-4-hydroxy-2'- or -3'- or -4'-methyl-1,1'-azobenzene,
3-amino-4-hydroxy-2' or -3'- or -4'-chloro-1,1'-azobenzene,
3-amino-4-hydroxy-2'-carboxy-1,1'-azobenzene,
3-amino-4-hydroxy-3' or -4'-acetylamino-1,1'-azobenzene or,
3-amino-4-hydroxy-1,1'-azobenzene-3'- or -4'-sulfonic acid, and the 2-amino-1-hydroxybenzene sulfonic acid phenyl amide by the equivalent amount of 2-amino-1-hydroxybenzene-4- or -5-sulfonic acid amide, 2-amino-1-hydroxybenzene-4- or -5-sulfonic acid-methyl amide, 2-amino-1-hydroxybenzene-4- or -5-sulfonic acid-2'-hydroxy ethyl amide, 2-amino-1-hydroxybenzene-4- or -5-sulfonic acid-3'-methoxypropyl amide, 2-amino-1-hydroxybenzene-4- or -5-sulfonic acid-2'-carboxyphenyl amide, 2-amino-1-hydroxy benzene-4- or -5-sulfonic acid hexyl amide, very similar dyes with equally good properties are obtained.

EXAMPLE 7

9 parts of sodium bicarbonate and 8.4 parts of cyanoacetamide are dissolved in 130 parts of water at 20° and the solution cooled to 0°. In 10 minutes a neutral diazo solution at 0°, prepared in the normal way with 7.2 parts of anthranilic acid is run in. After 15 minutes the precipitated yellow monoazo dye thus formed is filtered off. It is stirred into 200 parts of an ice-cold neutral diazo solution also containing 7.2 parts of anthranilic acid. Within 5 minutes and with constant cooling to 0° 20% sodium hydroxide solution is run in until the reaction solution has reached a pH value of 10.5. Stirring is continued with cooling to 0–5° until the coupling reaction is completed, then acetic acid is added dropwise until the reaction mass has a weakly acid reaction. 10 parts of copper acetate are added and the mass heated at 70° until no further metal-free dye is indicated in the chromatogram of a sample. Finally the dye is precipitated, filtered off and dried.

The new dye dyes wool, silk and synthetic polyamide fibers in fast red shades. It is also suitable for the spin dyeing of cellulose acetate.

The corresponding cobalt and nickel complexes can be produced in the same way.

When the 7.2 parts of anthranilic acid used in this example are replaced by the equivalent amount or half the equivalent amount of one of the following, very similar dyes giving comparably fast dyeings are obtained.

2-amino-5-chlorobenzene-1-carboxylic acid,
2-amino-5-methylsulfonylbenzene-1-carboxylic acid,
2-aminobenzene-1-carboxylic acid-5-sulfonic acid methyl amide,
2-aminobenzene-1-carboxylic acid-5-sulfonic acid-2'-hydroxypropyl amide,
2-aminobenzene-1-carboxylic acid-5-sulfonic acid-3'-methoxypropyl amide,
2-aminobenzene-1-carboxylic acid-5-sulfonic acid dimethyl amide,
2-aminobenzene-1-carboxylic acid-5-sulfonic acid-N-methyl phenyl amide,
2-aminobenzene-1-carboxylic acid-4- or -5-sulfonic acid phenyl amide,
2-aminobenzene-1-carboxylic acid-5-sulfonic acid-3' sulfomethylamino phenyl amide,
2-aminobenzene-1-carboxylic acid-5-sulfonic acid-3'-chlorophenyl amide,
2-aminobenzene-1-carboxylic acid-5-sulfonic acid cyclohexyl amide,
2-aminobenzene-1-carboxylic acid-5-sulfonic acid tetrahydronaphthyl(2)-amide,
2-aminobenzene-1-carboxylic acid-5-sulfonic acid-2'-carboxyphenyl amide,
2-aminobenzene-1-carboxylic acid-5-sulfonic acid-2'-methylphenyl amide, The corresponding nickel- and cobalt-containing dyes can be produced on analogous lines and give dyeings of the same good fastness as the copper-containing type.

EXAMPLE 8

23.2 parts of the monoazo dye produced according to Example 7 from anthranilic acid and cyanoacetamide are suspended in 200 parts of ice-cold water with good stirring and added to an ice-cold neutral diazo suspension obtained by diazotization of 30 parts of 2-amino-1-hydroxybenzene-4-sulfonic acid-3'-chlorophenyl amide. After the addition of 25 parts of copper pentahydrate, 15% sodium hydroxide solution is gradually added in 2 hours with cooling to 0° until the pH value of the reaction solution has increased to 11. Stirring is continued at 0° until the reaction is completed. The blue dye is precipitated, filtered off and purified by dissolving and re-crystallization. It dyes wool, silk and synthetic polyamide fibers from neutral or weakly acid baths in fast, level blue shades. It is also suitable for the spin dyeing of cellulose acetate. When the anthranilic acid used in this example is replaced by the equivalent amount of one of the anthranilic acid derivatives listed in Example 7, and the 2-amino-1-hydroxybenzene-4-sulfonic acid-3'-chlorophenylamide by one of 2-amino-1-hydroxybenzene derivatives mentioned in Example 1, very similar and equally valuable dyes are obtained. The nickel- and cobalt-containing dyes can be produced in an analogous manner and give dyeings of equally good fastness as the copper-containing dye.

Formulae of representative dyes of the foregoing examples are as follows:

*Example 1*

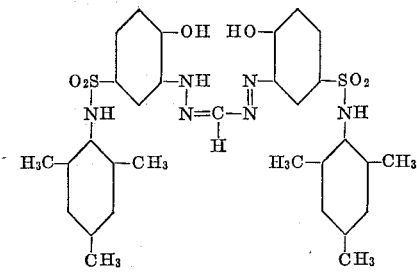

*Example 2*

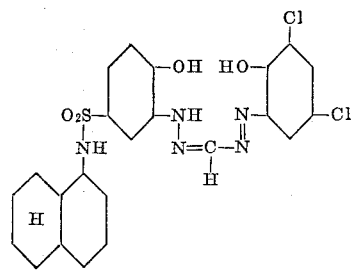

*Example 3*

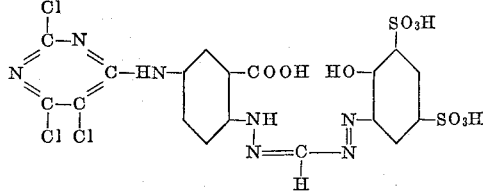

*Example 4*

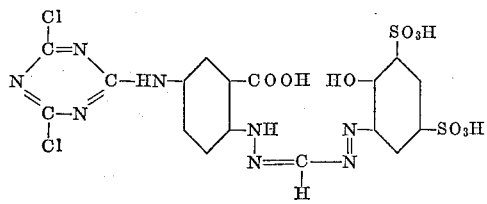

*Example 5*

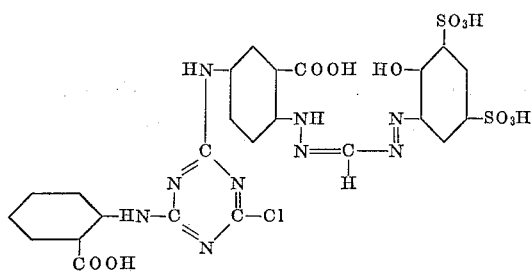

*Example 6*

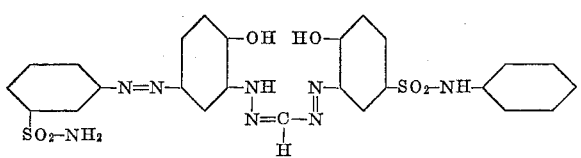

*Example 7*

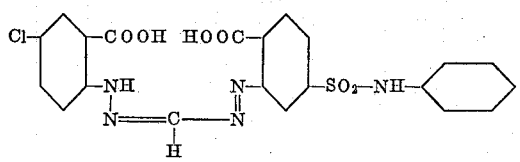

*Example 8*

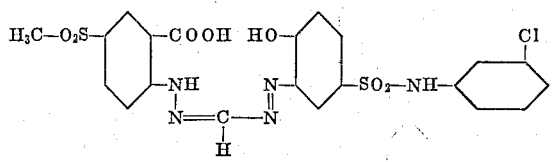

Having thus disclosed the invention, what I claim is:
1. The 1:1 copper complex compound of the formazane dye which in metal free form is of the formula

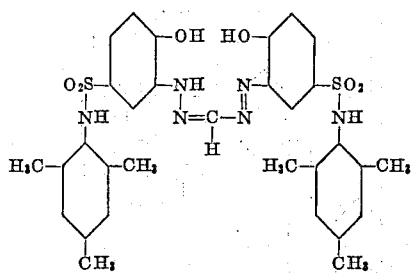

2. The 1:1 copper complex compound of the formazane dye which in metal free form is of the formula

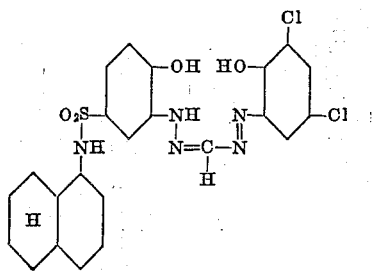

3. The 1:1 copper complex compound of the formazane dye which in metal free form is of the formula

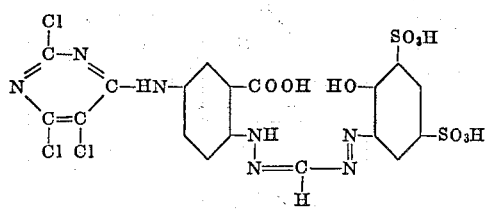

4. The 1:1 copper complex compound of the formazane dye which in metal free form is of the formula

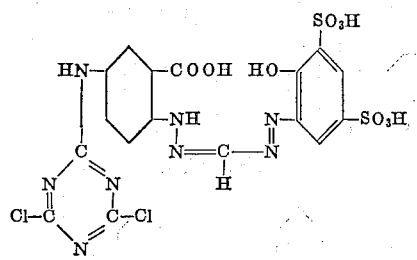

5. The 1:1 copper complex compound of the formazane dye which in metal free form is of the formula

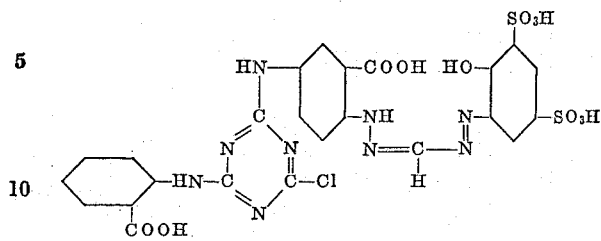

6. The 1:1 copper complex compound of the formazane dye which in metal free form is of the formula

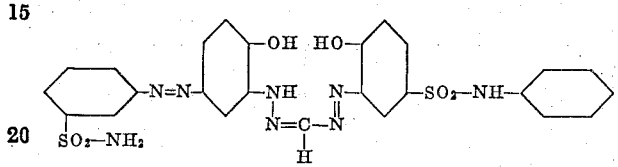

7. The 1:1 copper complex compound of the formazane dye which in metal free form is of the formula

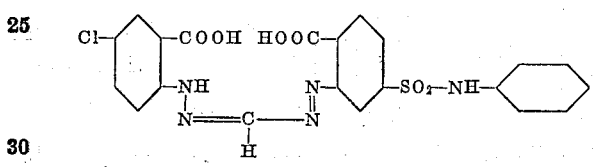

8. The 1:1 copper complex compound of the formazane dye which in metal free form is of the formula

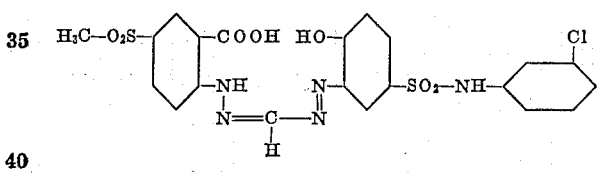

9. The 1:1 nickel complex compound of the formazane dye which in metal free form is of the formula

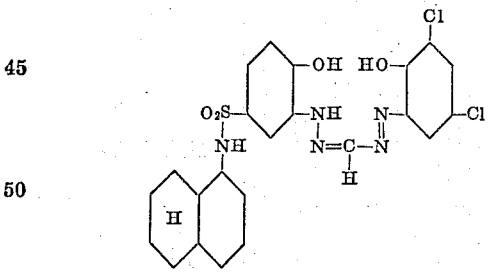

References Cited by the Examiner

UNITED STATES PATENTS

| | | | |
|---|---|---|---|
| 2,662,074 | 12/1953 | Brooks | 260—149 |
| 2,662,075 | 12/1953 | Brooks | 260—149 |
| 2,864,815 | 12/1958 | Ziegler | 260—149 |
| 3,041,328 | 6/1962 | Kraus et al. | 260—146 |
| 3,068,219 | 12/1962 | Beffa et al. | 260—146 |
| 3,139,420 | 6/1964 | Beffa et al. | 260—149 |

OTHER REFERENCES

Nineham: Chem. Reviews, vol. 55, No. 2, April 1955, pages 355–483.

CHARLES B. PARKER, *Primary Examiner.*

REYNOLD J. FINNEGAN, D. M. PAPUGA,
*Assistant Examiners.*